Feb. 16, 1965  W. J. MORRIS  3,169,506

OPERATION-INDICATING MEANS FOR PUSH-BUTTON-OPERATED MECHANISM

Filed Dec. 16, 1963

INVENTOR.
WILLIAM J. MORRIS

BY
ATTORNEY

United States Patent Office 3,169,506
Patented Feb. 16, 1965

3,169,506
OPERATION-INDICATING MEANS FOR PUSH-BUTTON-OPERATED MECHANISM
William J. Morris, Woodbury, N.J., assignor to Philco Corporation, Philadelphia, Pa., a corporation of Delaware
Filed Dec. 16, 1963, Ser. No. 330,937
3 Claims. (Cl. 116—124.4)

This invention relates generally to push-button-operated mechanism and more particularly to novel and improved means responsive to the individual push-button to provide visual indication of the operative condition of such mechanism.

While of broader applicability the invention will be described in connection with its use with push-button-operated mechanism adapted to control the various functions of high fidelity phonograph apparatus. It should be understood, however, that the invention is usable with many types of control mechanism in which selection is achieved by operation of any one of a plurality of selectably movable elements.

One object of the invention is the provision of a novel optical system for achieving selective illumination of indicator means individual to the push-button controls for the purpose of affording visual indication of the operative condition of the push-button-operated mechanism.

Still another object of the invention is the provision of a unique optical system for achieving uniform dispersion of light from a single light source over a plurality of serially aligned prismatic elements associated respectively with a series of push-buttons.

A further and subordinate object of the invention is the provision of simplified means, using a single light source, for achieving selective varicolored illumination of individual ones of a plurality of transparent, serially aligned lenses, each correlated with a specific push-button element.

These, and other objects and features of the instant invention will be apparent from a consideration of the following detailed description taken in conjunction with the accompanying drawings, in which.

The invention, in its most elemental form utilizes an optical system comprising a single source of light, an elongate light-transmitting and light-dispersing prism positioned to intercept light emanating from the light source, a plurality of transparent lens-like indicators serially aligned along the length of said prism, and a plurality of shutter elements associated with and individually operable by a series of translatable control elements, interposed in the optical path between said prism and individual indicators, which shutter elements are selectively operable either to permit or prevent transmission of light from the prism to the indicator elements.

Figure 1:
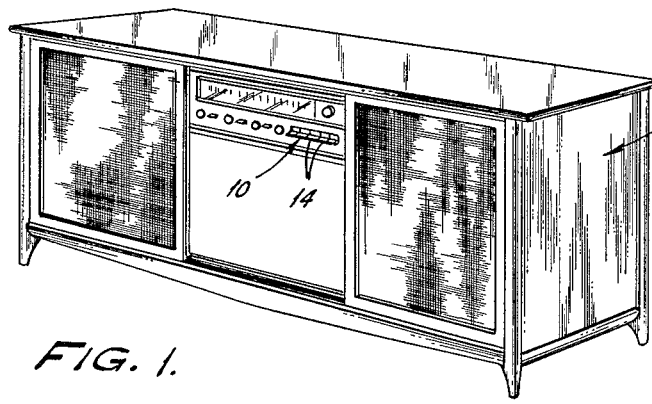
FIGURE 1 is a perspective showing of high fidelity phonograph apparatus embodying the present invention.

Referring first to FIGURE 1, a push-button-operated control system 10 is shown embodied in high fidelity phonograph apparatus 12. In the illustrated embodiment, the push-buttons control such functions as the on-off switch, phonograph operation, tape recording and the AM–FM tuner positions. As previously indicated, the invention is independent of the type of unit undergoing control and could be used, for example, in conjunction with tuning mechanism for automobile radios, television receivers, or any one of a plurality of related purposes.

Figure 2:
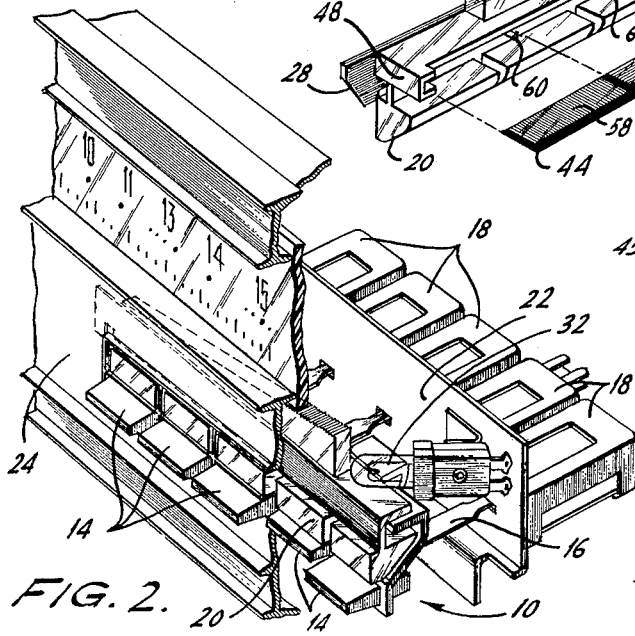
FIGURE 2 is a partially cut away sectional perspective, showing a preferred form of the instant invention in cooperative combination with push-button-operated mechanism.

Constructional details of the push-button-operated system 10 illustrated in FIGURE 1 are shown in FIGURE 2. As illustrated, each of the push-buttons 14 is coupled, through conventional linkage 16, to individual ones of a plurality of multiple-switch elements 18. As viewed in FIGURE 2, the second of the switch elements, counting from the right hand side of the drawing, is shown in its actuated position. The apparatus of the invention in the form illustrated is designed to provide visual indication of that fact through selective illumination of the transparent indicator lens 20 associated with the actuated push-button.

The switches 18, inclusive of their associated push-buttons, are carried by a vertically disposed chassis 22. The chassis is secured, as by machine screws, not shown, to panel 24 which, in turn, is mounted to the phonograph cabinet structure 12.

The optical portion of the system comprises an elongate light-transmitting and dispersing prism 26 and a plurality of indicator lenses 20 disposed in serial alignment along the length of the prism. Conveniently, the optical system is injection molded from acrylic plastic, or other optically suitable material, as an integral assembly. One such assembly is shown in sectional relief in FIGURE 3 and denominated by the numeral 27. The part 28 serves as a common mount for the individual lenses 20 and prism 26 and performs no optical function. The forwardly-presented face 30 of the interconnecting part can be, and preferably is, made opaque to reduce light losses. The unitized structure comprising the prism and associated lenses can then be removably mounted upon panel 24 as a single composite assembly.

Figure 3:
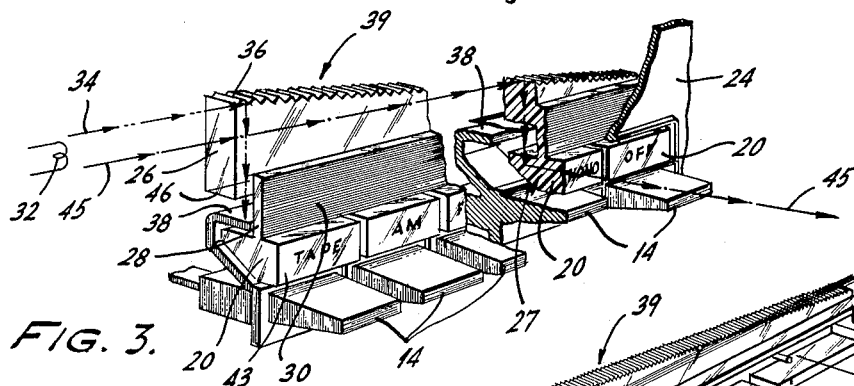
FIGURE 3 is a schematic illustration of essential elements of the optical system comprising the invention.

Each lens element or indicator 20 may desirably be provided with indicia indicative of the function controlled by the push-button associated with that particular indicator element, as shown in FIGURE 3.

Figure 6:
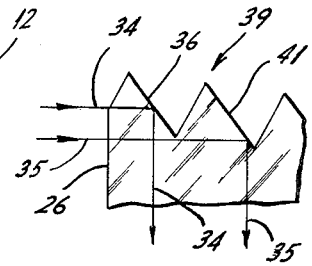
FIGURE 6 is a greatly enlarged view of a portion of a serrated prism shown in FIGURE 3, and depicting its operational function by the use of ray traces.

Referring to the schematic illustrations of FIGURES 3 and 6, uniform dispersion of light to any one of the plurality of indicator elements 20 is achieved, using a single light source 32, by means of the uniquely serrated prism 26. Following the ray traces 34 and 35 it will be seen that the rays entering prism 26 impinge on adjacent faces 36 and 41 formed by serrations 39 provided in a surface of the prism. The reflecting surfaces formed by the serrations are arranged in step-like fashion so as to successively intercept a portion of the incident light to effect uniform dispersion of the light in the manner schematically shown by the representative ray traces 34 and 35.

Light intensification may, if desired, be accomplished by interposing, between the light source 32 and prism 46, a collimating lens, not shown. Under average home lighting conditions, however, a 6-volt pilot lamp 32 positioned as shown in FIGURE 2 provides satisfactory illumination of the indicator system.

By providing the serration with a proper rake angle the incident rays are totally internally reflected in the manner graphically shown in FIGURE 6, since the angle of incidence is equal to or greater than the critical angle for the material out of which the prism 26 is made. Accordingly the energy transmitted in the reflected beam is maximized. Since the push-button associated with the first indicator lens 20, as shown, is in its rest or inactivated position FIGURE 3, the shutter 38, formed as an integral part of the push-button 14 (FIGURE 5) acts to block transmission of light to the lens. On actuation of the push-button, the shutter is removed from its masking position, as illustrated in full lines in FIGURE 5, permitting transmission of light to the lens associated with the activated button.

One constructional arrangement for achieving uniform dispersion of incident light is to taper the prism 26 in the manner shown in the drawing, and to provide a series of equal-depth serrations 39 along the prism's tapered edge. The incident light is progressively intercepted, as diagrammatically shown in FIGURE 6, by a series of reflecting surfaces, such as the surfaces 36 and 41 shown in that figure, producing a uniform, downwardly-directed diffusion of light. The same effect could be accomplished, for example, by employing a non-tapering prism provided with a series of serrations of increasing depth to produce a graded interception of the light. The greater the number of serrations the more uniform the light-diffusion pattern produced and conversely the fewer the serrations the more localized and striated the light effect. One advantageous feature of using a tapered prism is its simplicity of construction and adaptability to small areas.

As previously mentioned depression of a push-button results in removing the shutter 38 carried by that push-button from its light-interfering position in the optical path between the light source 32 and the indicator element 20 associated with that push-button. This permits passage of light rays reflected from the surfaces formed by the serrations 39 to the lens element underlying that surface. The back edge 42 of each lens is beveled to produce total internal reflection of the incident light in order to direct it toward the lens face 43. This constructional feature and its optical effect is illustrated in FIGURES 3 and 5 by following the ray trace 45.

Figure 5:
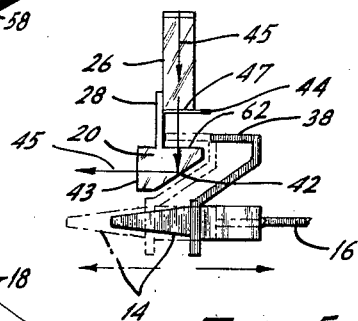
FIGURE 5 is a schematic side elevational view depicting essential operative features of the invention.

The shutter operation also is shown schematically in FIGURE 5, the activated position of the push-button being shown in full lines. As seen in that figure, removal of the shutter from its obturating position, on depression of push-button 20, permits light, as exemplified by ray 45, to pass into lens 20 to be internally reflected off its beveled rear wall 42, illuminating the lens face 43.

By conventional means, not shown, the depression of one button effects release of any previously actuated button, with the result that the shutter element associated with the release button is automatically returned to the light-blocking position shown in phantom in FIGURE 5. Concurrent with this action the shutter associated with the activated button is withdrawn from its light-blocking position.

Another feature which is often desired in connection with push-button-operated apparatus is the provision of some form of color coding to aid in visual identification of the operative condition of the apparatus. The constructional features of the disclosed system permit the achievement of this end by the simple expedient of adding to the system the filter-retaining structure 46 designed to house the unitary filter element 44 shown in FIGURE 4. This element may, for example, comprise an edge-reinforced acetate strip containing the desired number of vari-colored filters 50, 52, 54, 56 and 58. The strip may be cemented to the underface 47 of prism 26 as shown in FIGURE 5 or may be removably inserted within grooved guide blocks 48 as provided by structure 46. To prevent sagging of the strip, support pins or nibs 60 are provided. It is possible, using the structural form shown, to place the filter element 44 on the upper surface 62 (FIGURE 5) of lens element 20 thereby producing coloration, although not illumination, of the lens face when indicating an inactive condition. Alternatively, the indicator lenses can be made to show black when their associated push-buttons are inactivated by simply making the shutter element 38 opaque and placing the color filter 44 against face 47 as shown in FIGURE 5.

Figure 4:
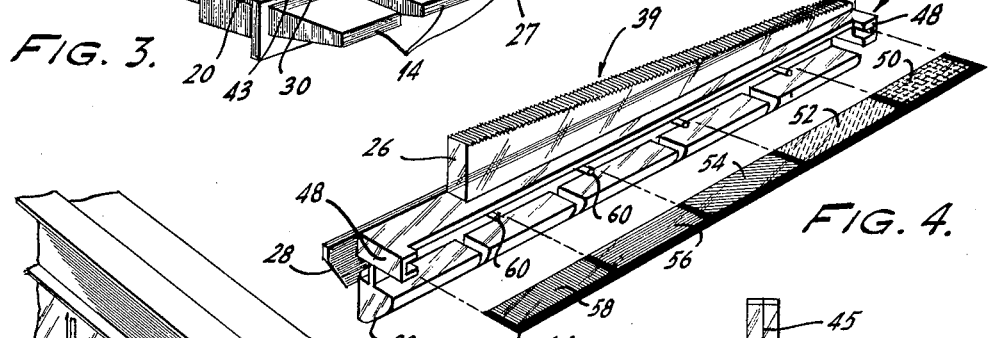
FIGURE 4 is a rear perspective view of an optical system of alternate construction adapted for use with color filters.

In applications in which it is desired to achieve substantially uniform intensity of lighting of the various indicator elements, notwithstanding the difference in their distances from the light source 32, a graded color scheme, such as that diagrammatically indicated in FIGURE 4 is used. In arrangement the individual frames of the filter are positioned so that the colors range from dark to light in accordance with the distance of the frames from the light source.

In summary, there is provided a novel optical system of improved simplicity and compactness for use with push-button-operated mechanism, which allows for visual indication of the operative condition of the mechanism occasioned by operation of individual ones of the push-buttons. Moreover, the system in its preferred embodiment is novelly adapted, both to achieve uniform dispersion of light over a plurality of serially aligned transparent elements and to permit color variation in the illumination of the elements by means of a readily removable color filter designed as an integral part of the system.

While a preferred form of the present invention has been depicted and described, it will be understood by those skilled in the art that the invention is susceptible of changes and modifications without departing from the essential concepts thereof, and that such changes and modifications are contemplated as coming within the terms of the appended claims.

I claim:

1. A control device comprised of a plurality of individually selectable, movable elements, including an optical system for selectively visually indicating the operative condition of individual ones of said elements comprising:
   (a) a plurality of serially aligned light-transmissive indicator elements individual ones of which are positioned adjacent individual ones of said movable elements,
   (b) a source of radiation,
   (c) a single elongate prism positioned to intercept radiation emanating from said source disposed contiguous said indicator elements and having provided therein a plurality of reflecting surfaces effective to reflect intercepted light onto individual ones of said indicator elements, and
   (d) shutter means translatable by said individual elements from a position preventing transmission of intercepted radiation to an associated indicator element to a position permitting such transmission.

2. A control device comprised of a plurality of push-buttons in side-by-side alignment and each including an optical system for selectively visually indicating the operative condition of individual ones of said push-buttons, comprising:
   (a) a plurality of aligned indicator lenses individual ones of which are positioned in close adjacency to individual ones of said push-buttons,
   (b) a source of light;
   (c) a single longitudinally tapered elongate prism having its length extending contiguous said indicator lenses and having provided in a longitudinal surface thereof a series of uniformly spaced, equal-depth serrations disposed to intercept light emanating from said source and effective to reflect intercepted light onto individual ones of said indicator lenses, and
   (d) shutter means carried by each of said push-buttons and movable thereby into a first position, preventing transmission of reflected light to an associated indicator lens, and a second position permitting such transmission.

3. A control device comprised of a plurality of individually selectable push-buttons and including an optical system for selectively visually indicating the operative condition of individual ones of said push-buttons, comprising:
   (a) a plurality of serially aligned lens elements individual ones of which are positioned adjacent individual ones of said push-buttons, (b) a source of light;

(c) a single elongate prism having its length extending contiguous said lens elements and having formed in a longitudinal surface thereof a progression of reflecting surfaces positioned to intercept light emanating from said source and to reflect said intercepted light onto said lens elements, (d) shutter elements individually operable by each of said push-buttons and movable thereby between a position preventing transmission of intercepted light from said prism to said lens elements and a position permitting such transmission, and (e) a multi-colored filter element interposed between said prism and said lens elements whereby, on actuation of a push-button, selected and distinctive color coding of an associated lens is effected.

References Cited by the Examiner

UNITED STATES PATENTS

| | | | |
|---|---|---|---|
| 2,265,124 | 12/41 | Andres | 194—15 |
| 2,437,555 | 3/48 | Rees | 116—124 |
| 2,532,212 | 11/50 | Whittaker | 116—124.4 |
| 2,609,475 | 9/52 | Sandin et al. | 219—37 |
| 2,614,162 | 10/52 | Smith | 116—124 |
| 2,627,685 | 2/53 | Henry | 40—130 |

LOUIS J. CAPOZI, *Primary Examiner.*